United States Patent
Kim et al.

(10) Patent No.: US 12,506,665 B2
(45) Date of Patent: Dec. 23, 2025

(54) VIRTUAL NEGATIVE EDGE-BASED DIRECTED NETWORK EMBEDDING METHOD AND SYSTEM

(71) Applicant: IUCF-HYU (Industry University Cooperation Foundation Hanyang University), Seoul (KR)

(72) Inventors: Sang-Wook Kim, Seoul (KR); Hyun Sik Yoo, Seoul (KR); Yeon-Chang Lee, Seoul (KR)

(73) Assignee: IUCF-HYU (INDUSTRY UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 18/558,828

(22) PCT Filed: Apr. 21, 2022

(86) PCT No.: PCT/KR2022/005715
§ 371 (c)(1),
(2) Date: Nov. 3, 2023

(87) PCT Pub. No.: WO2022/234985
PCT Pub. Date: Nov. 10, 2022

(65) Prior Publication Data
US 2024/0243976 A1   Jul. 18, 2024

(30) Foreign Application Priority Data
May 6, 2021   (KR) .................... 10-2021-0058254

(51) Int. Cl.
*H04L 41/14* (2022.01)
*G06N 5/04* (2023.01)
*H04L 41/16* (2022.01)

(52) U.S. Cl.
CPC ............ *H04L 41/145* (2013.01); *G06N 5/04* (2013.01); *H04L 41/16* (2013.01)

(58) Field of Classification Search
CPC ....... H04L 41/145; H04L 41/16; H04L 41/12; G06N 5/04; G06N 5/00; G06N 20/00; G06N 5/01
See application file for complete search history.

(56) References Cited

U.S. PATENT DOCUMENTS

2017/0033976 A1   2/2017 Ahmed et al.
2020/0342523 A1*  10/2020 Shah .................. G06F 16/9566
2021/0303638 A1*  9/2021 Zhong ................ G06F 40/169

FOREIGN PATENT DOCUMENTS

KR   10-2021-0032105   3/2021

OTHER PUBLICATIONS

Lee, Yeon-Chang et al. "ASiNE: Adversarial Signed Network Embedding", SIGIR'20, Jul. 25-30, 2020. p. 609-618 (Year: 2020).*

(Continued)

*Primary Examiner* — Brian J. Gillis
*Assistant Examiner* — Juan C Turriate Gastulo
(74) *Attorney, Agent, or Firm* — CHRISTENSEN O'CONNOR JOHNSON KINDNESS PLLC

(57) ABSTRACT

A virtual negative edge-based directed network embedding method and system are disclosed. A network embedding method performed by a network embedding system according to an embodiment may comprise the steps of: searching for a virtual negative edge representing a potentially negative relationship between nodes within a directed network; and performing network embedding for expressing the nodes within the directed network as low-dimensional vectors by using the searched virtual negative edge.

15 Claims, 6 Drawing Sheets

(56) References Cited

OTHER PUBLICATIONS

Gu, Shensheng et al. "Link Prediction on Signed Social Networks Based on Latent Space Mapping", Applied Intelligence, Sep. 14, 2018. p. 703-722 (Year: 2018).*

Panagiotis Symeonidis et al. "Transitive node similarity: predicting and recommending links in signed social networks", vol. 17, Jun. 2, 2013. p. 743-776 (Year: 2013).*

Wang, Ping et al. "Self-Supervised Learning of Contextual Embeddings for Link Prediction in Heterogeneous Networks" Virginia Tech and Pacific Northwest National Laboratory, Mar. 21, 2021. p. 1-12 (Year: 2021).*

Wang et al., "Signed Network Embedding in Social Media" Proceedings of the 2017 SIAM International Conference on Data Mining (SDM). 2017, 327-335. Retrieve on Mar. 21, 2025 from <https://epubs.siam.org/doi/epdf/10.1137/1.9781611974973.37> (Year: 2017).*

Ye et al., "Edge2vec: Edge-based Social Network Embedding", ACM Trans. Knowl. Discov. Data 14, 4, Article 45 (May 2020), 24 pages. Retrieve on Mar. 21, 2025 from <https://dl.acm.org/doi/pdf/10.1145/3391298> (Year: 2020).*

Lee, Yeon-Chang et al., ASiNE: Adversariai Signed Network Embedding. SIGR'20, Virtual Event, China (Jul. 25, 2020).

Armandpour, Mohammadreza et al., Robust Negative Sampling for Network Embedding., The Thirty-Third AAAI Conference on Artificai intelligence (AAAI-19). (Jul. 17, 2019).

Zhang, Daokun et al., SINE: Scalable Incomplete Network Embedding. arXiv: 1810.06768v1 [03.81]. (Oct. 2018).

International Search Report (and translation) for PCT/KR2022/005715 (International Filing Date: Apr. 21, 2022), mailed Jul. 28, 2022.

* cited by examiner

VIRTUAL NEGATIVE EDGE-BASED DIRECTED NETWORK EMBEDDING METHOD AND SYSTEM

CROSS-REFERENCE TO RELATED APPLICATIONS

This application is a National Stage Application of PCT/KR2022/005715, filed Apr. 21, 2022, which claims the benefit of KR 10-2021-0058254, filed May 6, 2021, the disclosures of which are incorporated by reference in their entirety.

TECHNICAL FIELD

The following description relates to a network embedding method and system and, more particularly, to technology for representing a directed network as low-dimensional vectors.

RELATED ART

Network embedding (NE) aims to represent nodes in a given network using low-dimensional vectors such that the vectors preserve structural properties, such as proximity, in a single embedding space. In recent studies, proposed is technology for improving accuracy of network embedding by incorporating additional information, such as edge directions, edge signs, and node attributes. For example, describing using network embedding technology that uses edge directions, although a user follows an influencer in a social network service, the influencer may be unaware of presence of the user and may not follow the user. This relationship may be expressed in a network by allowing the user to direct the influencer without the influencer directing the user. However, existing undirected network embedding methods are not designed to consider edge directions. Therefore, embedding of a node obtained through a conventional method may not accurately capture an asymmetric relationship between nodes.

To solve this limitation, various directed network embedding methods capable of considering edge directions between nodes are proposed. However, the directed network embedding methods have difficulty in accurately capturing a relationship between nodes.

DETAILED DESCRIPTION

Technical Subject

Example embodiments may provide a method and system that may search for a virtual negative edge representing a latent negative relationship between nodes in a directed network.

Example embodiments may provide a method and apparatus that may perform network embedding for expressing nodes in a directed network as low-dimensional vectors using a virtual negative edge.

Technical Solution

A network embedding method performed by a network embedding system may include searching for a virtual negative edge that represents a latent negative relationship between nodes in a directed network; and performing network embedding for expressing the nodes within the directed network as low-dimensional vectors using the found virtual negative edge.

The searching may include, for each node pair that includes a source node and a target node in a positive edge present in the directed network, selecting the number and locations of virtual negative edges by inferring the degree of latent negativity of the source node with respect to the target node.

The searching may include determining that the lower the degree of positivity of the source node with respect to the target node, the higher the degree of negativity with respect to the target node.

The searching may include inferring the degree of positivity of the source node with respect to the target node in the positive edge present in the directed network using weighted regularized matrix factorization (WRMF).

The searching may include expressing a case in which a directed edge corresponding to each entry is present as 1 and a case in which the directed edge corresponding to each entry is absent as 0 using an adjacency matrix of the directed network and constructing a weight matrix through the expression.

The searching may include selecting a virtual negative edge from the source node through a local selection strategy based on the inferred degree of latent negativity.

The searching may include selecting an equal number of virtual negative edge per the source node, sorting a list of all non-existent edges from the source node in descending order of the degree of negativity, and selecting a predefined number of non-existent edges as virtual negative edges for the source node from the beginning of the sorted list.

The searching may include modeling a signed directed network by adding the found virtual negative edge based on structural balance.

The searching may include determining the number of virtual negative edges by considering the number of positive edges constructed in the directed network, and modeling the positive edges and the virtual negative edges selected based on the determined number of virtual negative edges as the signed directed network.

The performing may include learning embedding for a source node and a target node constructed in a modeled signed directed network and obtaining a source embedding vector of the source node and a target embedding vector of the target node that maintain asymmetric proximity between nodes.

The performing may include performing a directed random walk that starts from each seed node and moves along out-going edges and generating a sequence with edge signs.

The performing may include determining a positive sign and a negative sign for each node pair by analyzing a combination of edge signs from the source node to the target node in the generated sequence according to a balance theory.

The performing may include updating the source embedding vector and the target embedding vector to maximize or minimize proximity between the source embedding vector of the source node and the target embedding vector of the target node in each embedding space with respect to a node pair with the positive sign and the negative sign.

There may be provided a computer program stored in a non-transitory computer-readable recording medium to implement the network embedding method in the network embedding system.

A network embedding system may include an edge search unit configured to search for a virtual negative edge that represents a latent negative relationship between nodes in a directed network; and a network embedding unit configured to perform a network embedding for expressing the nodes within the directed network as low-dimensional vectors using the found virtual negative edge.

Effect

According to some example embodiments, it is possible to preserve asymmetric proximity in an embedding space by additionally using a virtual negative edge in addition to a positive edge.

According to some example embodiments, it is possible to alleviate a network sparsity issue using additional information provided from an edge sign.

BEST MODE

Hereinafter, example embodiments will be described in detail.

Figure 1:
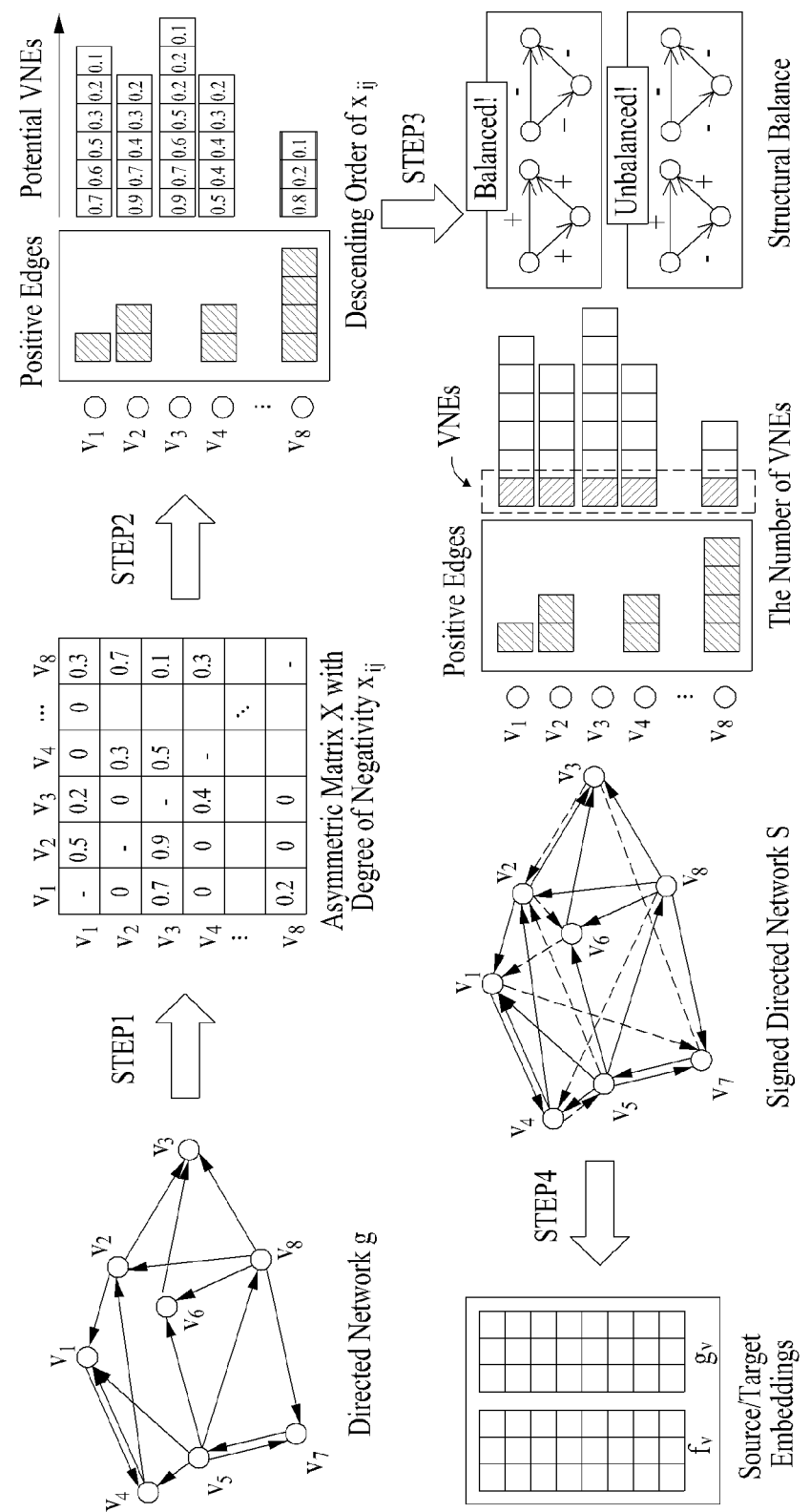
FIG. 1 illustrates an example of explaining an operation of a network embedding system according to an example embodiment.

FIG. 1 illustrates an example of explaining an operation of a network embedding system according to an example embodiment.

The network embedding system may improve accuracy of various network analysis tasks including network embedding using a positive edge and a negative edge. The network embedding system may select the number and locations of virtual negative edges that represent a negative relationship between nodes in a directed network, may add a virtual negative edge in the directed network, and may perform network embedding using signs and directions of edges.

The network embedding system needs to select some virtual negative edges from among potential virtual negative edges. The network embedding system may regard edges present in the directed network as positive edges between nodes. The network embedding system may infer a virtual negative edge using a positive edge and may model two types of edges as a single signed directed network. The network embedding system may learn source vectors and target vectors of nodes such that asymmetric proximity of the modeled signed directed network may be preserved in an embedding space. Here, when the signed directed network is given, various methods may be applied to perform network embedding.

The network embedding system may infer the degree of latent negativity of a source node with respect to a target node from a non-existent edge using a positive edge between nodes. Here, the degree of negativity of the source node with respect to the target node and the degree of negativity of the target node with respect to the source node may differ from each other. The network embedding system may find the number of nodes with respect to which the source node has the highest degree of negativity with respect to the source node and may add a virtual negative edge for the source node in a directed network of the corresponding node. For each node, the number of virtual negative edges may be determined based on structural balance of a signed network. When the virtual negative edge is added, the network embedding system may learn embedding of the source node and the target node using a network embedding method designed to be effective in the signed network. Here, it is shown that asymmetric proximity between nodes in the directed network is accurately captured using additional information obtained from the virtual negative edge.

Figure 4:
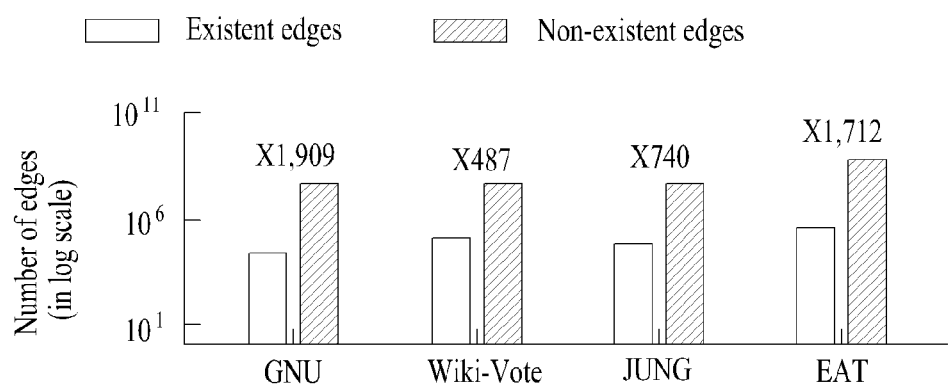
FIG. 4 illustrates the number of edges constructed in a network according to an example embodiment.

In detail, the network embedding system may perform Step 1 to Step 4 as follows:

Step 1: inferring the degree of negativity;
Step 2: selecting a virtual negative edge based on the degree of negativity;
Step 3: modeling a signed directed network; and
Step 4: Learning embeddings of a source node and a target node FIG. 4 illustrates the number of edges constructed in a network according to an example embodiment. FIG. 4 shows the number of existent edges and the number of non-existent edges in a real-world directed network. It can be observed that the number of non-existent edges is significantly large. For example, 39M, 50M, 37M, and 534M are for GNU, Wiki-Vote, JUNG, and EAT, respectively. As such, it is very challenging to selectively generate a small number of virtual negative edges among a large number of non-existent edges. The network embedding system may solve this issue through Step 1 to Step 3. Then, the network embedding system may learn embedding of a node using the network embedding method to be effective in a signed directed network.

In Step 1, the network embedding system may quantify the degree of negativity of all node pairs. The network embedding system may infer the degree of latent negativity by referring to a positive relationship given as a preceding task. The network embedding system may regard an existing edge as a positive edge. The network embedding system may infer the degree of positivity of a source node with respect to a target node from a positive edge. Here, it may be determined that the lower the degree of positivity of the source node with respect to the target node, the higher the degree of negativity with respect to the target node. For example, the network embedding system may use weighted regularized matrix factorization (WRMF) based on the preceding task. In the case of WRMF of the directed network, an asymmetric adjacency matrix $(A=(a_{ij})_{n \times n})$ of the directed network is used. A row and a column of adjacency matrix represent a source role and a target role for each node. Each entry indicates $a_{ij}=1$ when a corresponding directed edge $e_{ij}$ is present, or $a_{ij}=0$ when the directed edge is absent. Then, a weight matrix $(W=(w)_{n \times n})$ may be constructed. For a directed edge, a highest value of I may be assigned to a corresponding entry of the weight matrix (if $a_{ij}=1$, w=1). While an objective function is optimized using a weighted alternating least squares (wALS) method, an asymmetric adjacency matrix may be approximated by factorizing two low-rank matrices that represent a source role and a target role of each node as potential factors. The degree of negativity of each node is not necessarily symmetric. To infer the degree of negativity, other methods that are designed to consider edge directions may be employed instead of WRMF.

In Step 2, the network embedding system may select a virtual negative edge based on the degree of negativity. Here, when selecting virtual negative edges from among non-existent edges based on the degree of negativity, two strategies, global selection and local selection, may be considered. The global selection strategy is to select virtual negative edges with high degree of negativity from among all potential virtual negative edges regardless of a specific node. The global selection strategy may sort all non-existent edges in descending order of their degree of negativity. The local selection strategy is to select virtual negative edges with high degree of negativity from among potential nodes of a corresponding node for each node. The local selection strategy may select an equal number of virtual negative edges per source node. For each node, all non-existent edges may be sorted from a corresponding source node in descending order of their degree of negativity and then, a predefined number of non-existent edges may be selected as virtual negative edges for the source node from the beginning of a sorted list. In an example embodiment, an example of selecting virtual negative edges using the local selection strategy is described. By providing the equal number of virtual negative edges with respect to all nodes, the local selection strategy guarantees that every node has an equal opportunity to express its latent negative relationship.

Figure 5:
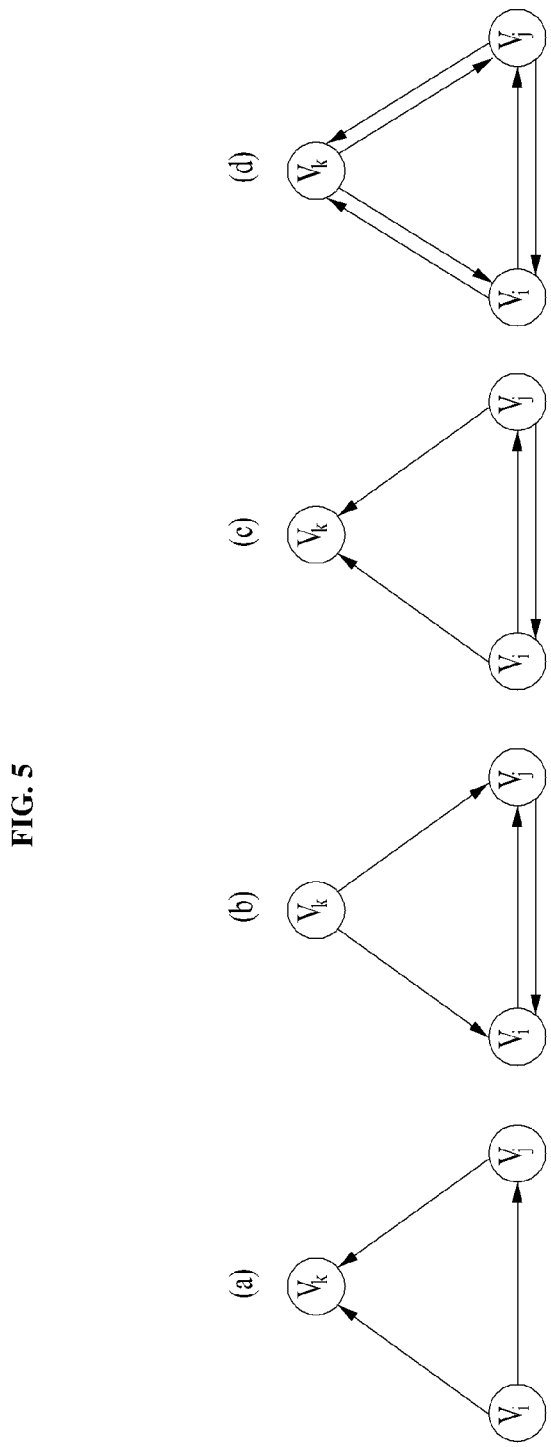
FIG. 5 illustrates a plurality of types of transitive triads in a directed network according to an example embodiment.
Figure 6:
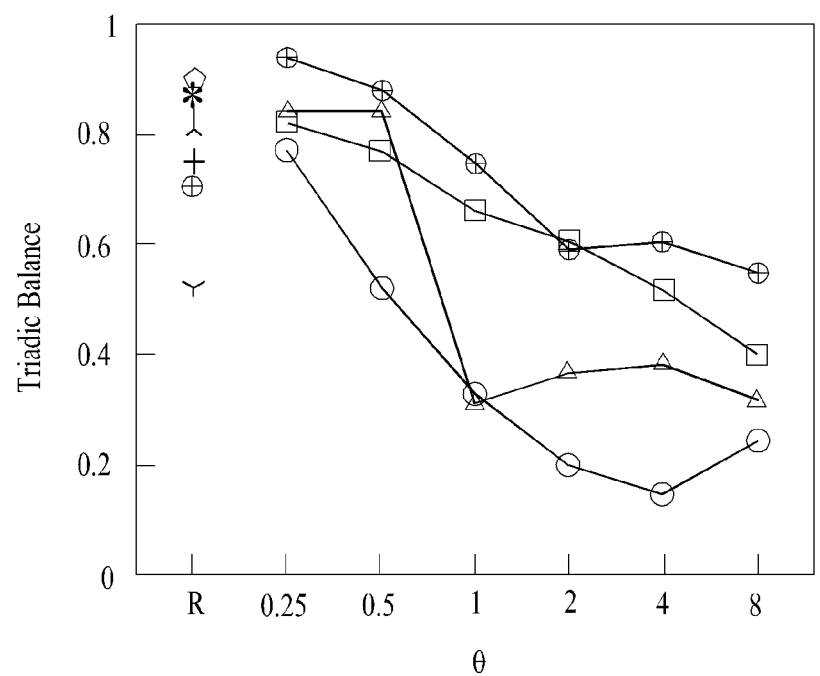
FIG. 6 illustrates a triadic balance in a signed directed network modeled from a directed dataset according to an example embodiment.
Figure 6:
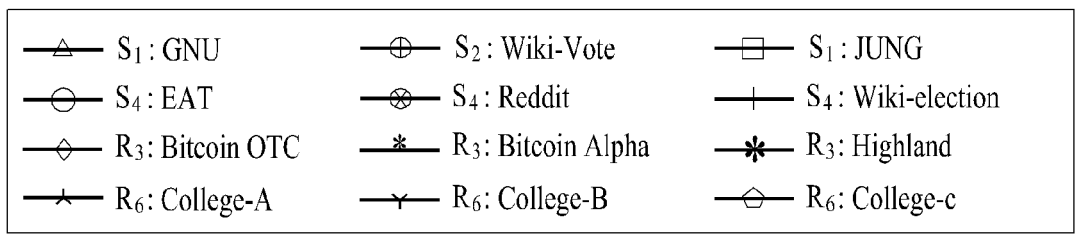

In Step 3, the network embedding system may model the signed directed network. The network embedding system may determine a total number of virtual negative edges to add and then, may model all of virtual negative edges and existing positive edges in the signed directed network. The network embedding system may consider the number of virtual negative edges based on the number of positive edges. Here, in the signed network, the number of negative edges is less than the number of positive edges. Moreover, only some of a large number of potential virtual negative edges clearly represent negative relationship. The network embedding system may set a parameter on an important property of the signed network, particularly, structural balance. The structural balance indicates how well a positive edge or a negative edge in the signed network structurally follows balance theory. The balance theory states four rules of real-world social relationship. For example, "a friend of my friend is my friend," "a friend of my enemy is my enemy," "an enemy of my friend is my enemy," and "an enemy of my enemy is my friend." The balance theory considers a triangle with an even number of negative edges as a balanced triangle and other triangles as unbalanced triangles. The structural balance has been studied primarily for a signed undirected network and most structural balance measures may not consider edge directions within triangles. Referring to FIG. 5, a plurality of (e.g., four) types of transitive triads are illustrate in a directed network. Triadic balance that measures structural balance in consideration with an edge sign within a signed directed network is proposed. In detail, the triadic balance may represent a ratio of balanced triangles among triangles of which edge directions among three nodes in the signed directed network meet transitivity. For example, when three nodes ($v_i$, $v_j$, and $v_k$) are given and $v_i$ indicates $v_j$ and $v_j$ indicates $v_k$, it may be regarded that, if $v_i$ indicates $v_k$, a relationship therebetween satisfies the transitivity. It represents that, the larger a triadic balance value, the better a structure of a positive edge and a negative edge within the signed directed network follows the balance theory. FIG. 6 illustrates triadic balance in a sign-based directed network modeled from a directed dataset (GNU, Wiki-vote, JUNG, EAT) according to an example embodiment. The x-axis represents a ratio of virtual negative edges (0=0.25, 0.5, 1, 2, 4, 8), and the y-axis represents a triadic balance value. Due to presence of a negative edge, the signed network has only a triadic balance value regardless of a ratio of virtual negative edges. Overall, the average triadic balance value of the signed network is 0.78 (min=0.5, max=0.9, sd=0.12), which is high. The result shows that a ratio of balanced triangles among triangles satisfying transitivity in the signed network is high. That is, it can be observed that a relationship between nodes in the signed network follows the balance theory. The signed directed network shows tendency that, as the ratio of virtual negative edges increases, the triadic balance value decreases. In particular, when the ratio of virtual negative edges is less than 1, the triadic balance value appears to be high. On the contrary, when the ratio of virtual negative edges is greater than or equal to 1, the triadic balance value appears to be low. That virtual negative edges with relatively low degree of negativity are imputed as the ratio of virtual negative edges increases represents that the balance theory is not more followed in the network. Therefore, the network embedding system may set the ratio of virtual negative edges to be less than 1. The network embedding system may model the signed directed network having positive edges and negative edges by imputing the determined number of virtual negative edges to a given network. The network embedding system may use rich information called edge signs when performing network embedding by considering a negative relationship as well as a positive relationship between nodes.

In Step 4, the network embedding system may perform embedding learning of the source node and the target node. The network embedding system may obtain source embedding vectors or target embedding vectors of nodes that maintain asymmetric proximity between nodes in the signed directed network. Basically, signed network embedding methods represent nodes connected as positive edges in the network to be close and nodes connected as negative edges to be distant in an embedding space. In addition, using the aforementioned balance theory, a relationship between unconnected nodes may be also inferred and additionally learned. The network embedding system may perform a directed random walk that starts from each seed node and moves along out-going edges, while generating a walk sequence $\{v_i \to v_1 \to v_2 \to \ldots > v_n\}$ with edge signs. The network embedding system may sample a directed node pair in which a source node precedes a target node in each sequence. The network embedding system may determine a sign of each node pair by analyzing a combination of edge signs from the source node to the target node in the sequence according to the balance theory. For each node pair with a positive sign and a negative sign, the network embedding system may update the vectors to maximize or minimize proximity between the source embedding vector of the source node and the target embedding vector of the target node.

Figure 2:
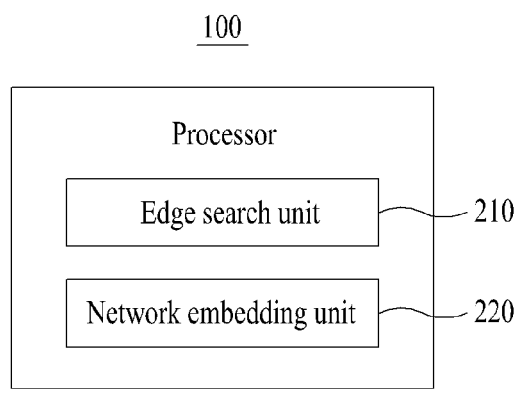
FIG. 2 is a block diagram illustrating a configuration of a network embedding system according to an example embodiment.
Figure 3:
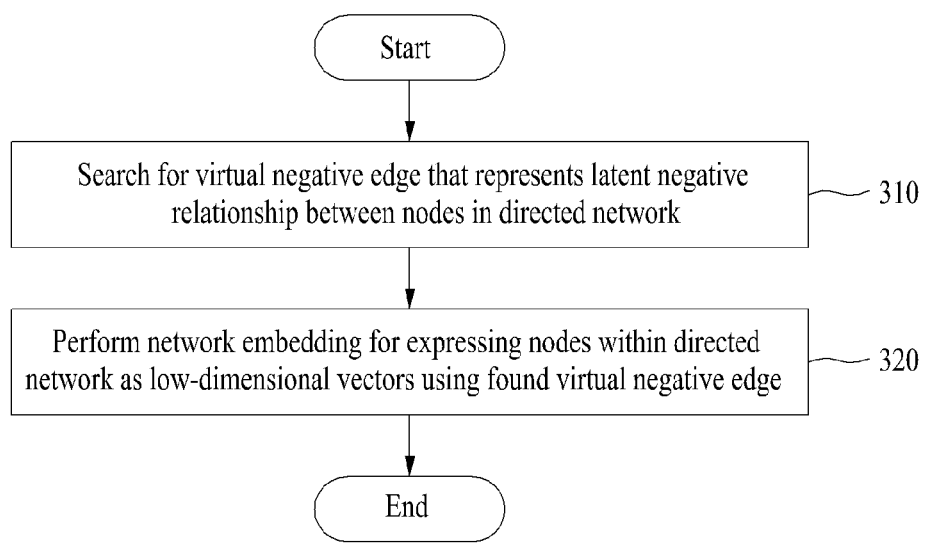
FIG. 3 is a flowchart illustrating a network embedding method in a network embedding system according to an example embodiment.

FIG. 2 is a block diagram illustrating a configuration of a network embedding system according to an example embodiment, and FIG. 3 is a flowchart illustrating a network embedding method in a network embedding system according to an example embodiment.

A processor of a network embedding system 100 may include an edge search unit 210 and a network embedding unit 220. The components of the processor may be representations of different functions performed by the processor in response to a control instruction provided from a program code stored in the network embedding system. The processor and the components of the processor may control the network embedding system to perform operations 310 and 320 included in the network embedding method of FIG. 3. Here, the processor and the components of the processor may be implemented to execute an instruction in responses to a code of at least one program and a code of an OS included in a memory.

The processor may load, to the memory, a program code stored in a file of a program for the network embedding method. For example, in response to execution of the program in the network embedding system, the processor may control the network embedding system to load the program code from the file of the program to the memory under control of the OS. Here, the edge search unit 210 and the network embedding unit 220 may be different functional representations of the processor to perform operations 310 and 320 by executing an instruction of a part corresponding to the program code loaded to the memory.

In operation 310, the edge search unit 210 may search for a virtual negative edge that represents a latent negative relationship between nodes in a directed network. For each node pair that includes a source node and a target node in a positive edge present in the directed network, the edge search unit 210 may select the number and locations of virtual negative edges by inferring the degree of latent negativity of the source node with respect to the target node. The edge search unit 210 may determine that the lower the degree of positivity of the source node with respect to the target node, the higher the degree of negativity with respect to the target node.

The edge search unit 210 may infer the degree of positivity of the source node with respect to the target node in the positive edge present in the directed network using weighted regularized matrix factorization (WRMF). The edge search unit 210 may express a case in which a directed edge corresponding to each entry is present as 1 and a case in which the directed edge corresponding to each entry is absent as 0 using an adjacency matrix of the directed network and may construct a weight matrix through the expression.

The edge search unit 210 may select a virtual negative edge from the source node through a local selection strategy based on the inferred degree of latent negativity. The edge search unit 210 may select an equal number of virtual negative edges per the source node, may sort a list of all non-existent edges from the source node in descending order of the degree of negativity, and may select a predefined number of non-existent edges as virtual negative edges for the source node from the beginning of the sorted list.

The edge search unit 210 may model a signed directed network by adding the found virtual negative edge based on structural balance. The edge search unit 210 may determine the number of virtual negative edges by considering the number of positive edges constructed in the directed network and may model the positive edges and the virtual negative edges selected based on the determined number of virtual negative edges as the signed directed network.

In operation 320, the network embedding unit 220 may perform network embedding for expressing the nodes within the directed network as low-dimensional vectors using the found virtual negative edge. The network embedding unit 220 may learn embedding for a source node and a target node constructed in a modeled signed directed network and may obtain a source embedding vector of the source node and a target embedding vector of the target node that maintain asymmetric proximity between nodes. The network embedding unit 220 may perform a directed random walk that starts from each seed node and moves along out-going edges and may generate a sequence with edge signs. The network embedding unit 220 may determine a positive sign and a negative sign for each node pair by analyzing a combination of edge signs from the source node to the target node in the generated sequence according to a balance theory. The embedding unit 220 may update the source embedding vector and the target embedding vector to maximize or minimize proximity between the source embedding vector of the source node and the target embedding vector of the target node in each embedding space with respect to a node pair with the positive sign and the negative sign.

The apparatuses described herein may be implemented using hardware components, software components, and/or combination of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, or computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the example embodiments may be configured in a form of program instructions performed through various computer devices and recorded in computer-readable media. The media may also include, alone or in combination with the program instructions, data files, data structures, and the like. The program instructions recorded in the media may be specially designed and configured for the example embodiments or may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of program instructions include both a machine code, such as produced by a compiler, and a higher level code that may be executed by the computer using an interpreter.

While the example embodiments are described with reference to specific example embodiments and drawings, it will be apparent to one of ordinary skill in the art that various changes and modifications in form and details may be made in these example embodiments from the description. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A network embedding method performed by a network embedding system, the network embedding method comprising:
   searching for a virtual negative edge that represents a latent negative relationship between nodes in a directed network; and
   performing network embedding for expressing the nodes within the directed network as low-dimensional vectors using the found virtual negative edge,
   wherein the searching comprises, for each node pair that includes each of source nodes and a target node in a positive edge present in the directed network, selecting the number and locations of virtual negative edges by inferring the degree of latent negativity of said each of the source nodes with respect to the target node,
   wherein the selecting comprises selecting a virtual negative edge from said each of the source nodes through a local selection strategy based on the inferred degree of latent negativity, and
   wherein the selecting of the virtual negative edge comprises
   selecting an equal number of virtual negative edges for said each of the source nodes,
   wherein the searching of the equal number of virtual negative edges comprises
   sorting a list of all non-existent edges from said each of the source nodes in descending order of the degree of negativity, and
   selecting the equal number of non-existent edges as virtual negative edges for said each of the source nodes from the beginning of the sorted list, and
   whereby, by selecting the equal number of virtual negative edges for said each of the source nodes, said each of the source nodes is ensured to have an equal capacity to represent the latent negative relationship.

2. The network embedding method of claim 1, wherein the searching comprises determining that the lower the degree of positivity of the source node with respect to the target node, the higher the degree of negativity with respect to the target node.

3. The network embedding method of claim 1, wherein the searching comprises inferring the degree of positivity of the source node with respect to the target node in the positive edge present in the directed network using weighted regularized matrix factorization (WRMF).

4. The network embedding method of claim 3, wherein the searching comprises expressing a case in which a directed edge corresponding to each entry is present as 1 and a case in which the directed edge corresponding to each entry is absent as 0 using an adjacency matrix of the directed network and constructing a weight matrix through the expression.

5. The network embedding method of claim 1, wherein the searching comprises modeling a signed directed network by adding the found virtual negative edge based on structural balance.

6. The network embedding method of claim 5, wherein the searching comprises determining the number of virtual negative edges by considering the number of positive edges constructed in the directed network, and modeling the positive edges and the virtual negative edges selected based on the determined number of virtual negative edges as the signed directed network.

7. The network embedding method of claim 1, wherein the performing comprises learning embedding for a source node and a target node constructed in a modeled signed directed network and obtaining a source embedding vector of the source node and a target embedding vector of the target node that maintain asymmetric proximity between nodes.

8. The network embedding method of claim 7, wherein the performing comprises performing a directed random walk that starts from each seed node and moves along out-going edges and generating a sequence with edge signs.

9. The network embedding method of claim 8, wherein the performing comprises determining a positive sign and a negative sign for each node pair by analyzing a combination of edge signs from the source node to the target node in the generated sequence according to a balance theory.

10. The network embedding method of claim 9, wherein the performing comprises updating the source embedding vector and the target embedding vector to maximize or minimize proximity between the source embedding vector of the source node and the target embedding vector of the target node in each embedding space with respect to a node pair with the positive sign and the negative sign.

11. A non-transitory computer-readable recording medium having stored therein a computer program configured to cause a network embedding system to perform steps comprising:
   searching for a virtual negative edge that represents a latent negative relationship between nodes in a directed network; and
   performing network embedding for expressing the nodes within the directed network as low-dimensional vectors using the found virtual negative edge,
   wherein the searching comprises, for each node pair that includes each of source nodes and a target node in a positive edge present in the directed network, selecting the number and locations of virtual negative edges by inferring the degree of latent negativity of said each of the source nodes with respect to the target node,
   wherein the selecting comprises selecting a virtual negative edge from said each of the source nodes through a local selection strategy based on the inferred degree of latent negativity, and
   wherein the selecting of the virtual negative edge comprises
   selecting an equal number of virtual negative edges for said each of the source nodes,
   wherein the searching of the equal number of virtual negative edges comprises
   sorting a list of all non-existent edges from said each of the source nodes in descending order of the degree of negativity, and
   selecting the equal number of non-existent edges as virtual negative edges for said each of the source nodes from the beginning of the sorted list, and whereby, by selecting the equal number of virtual negative edges for said each of the source nodes, said each of the source nodes is ensured to have an equal capacity to represent the latent negative relationship.

12. A network embedding system comprising:

an edge search unit configured to search for a virtual negative edge that represents a latent negative relationship between nodes in a directed network; and a network embedding unit configured to perform network embedding for expressing the nodes within the directed network as low-dimensional vectors using the found virtual negative edge, wherein the edge search unit is configured to, for each node pair that includes each of source nodes and a target node in a positive edge present in the directed network, select the number and locations of virtual negative edges by inferring the degree of latent negativity of said each of the source nodes with respect to the target node, wherein the edge search unit is configured to select a virtual negative edge from said each of the source nodes through a local selection strategy based on the inferred degree of latent negativity by selecting an equal number of virtual negative edges for said each of the source nodes, wherein the searching of the equal number of virtual negative edges comprises sorting a list of all non-existent edges from said each of the source nodes in descending order of the degree of negativity, and selecting the equal number of non-existent edges as virtual negative edges for said each of the source nodes from the beginning of the sorted list, and whereby, by selecting the equal number of virtual negative edges for said each of the source nodes, said each of the source nodes is ensured to have an equal capacity to represent the latent negative relationship.

13. The non-transitory computer-readable recording medium of claim 11, wherein the searching comprises determining that the lower the degree of positivity of the source node with respect to the target node, the higher the degree of negativity with respect to the target node.

14. The non-transitory computer-readable recording medium of claim 11, wherein the searching comprises inferring the degree of positivity of the source node with respect to the target node in the positive edge present in the directed network using weighted regularized matrix factorization (WRMF).

15. The non-transitory computer-readable recording medium of claim 14, wherein the searching comprises expressing a case in which a directed edge corresponding to each entry is present as 1 and a case in which the directed edge corresponding to each entry is absent as 0 using an adjacency matrix of the directed network and constructing a weight matrix through the expression.

* * * * *